Patented Feb. 20, 1940

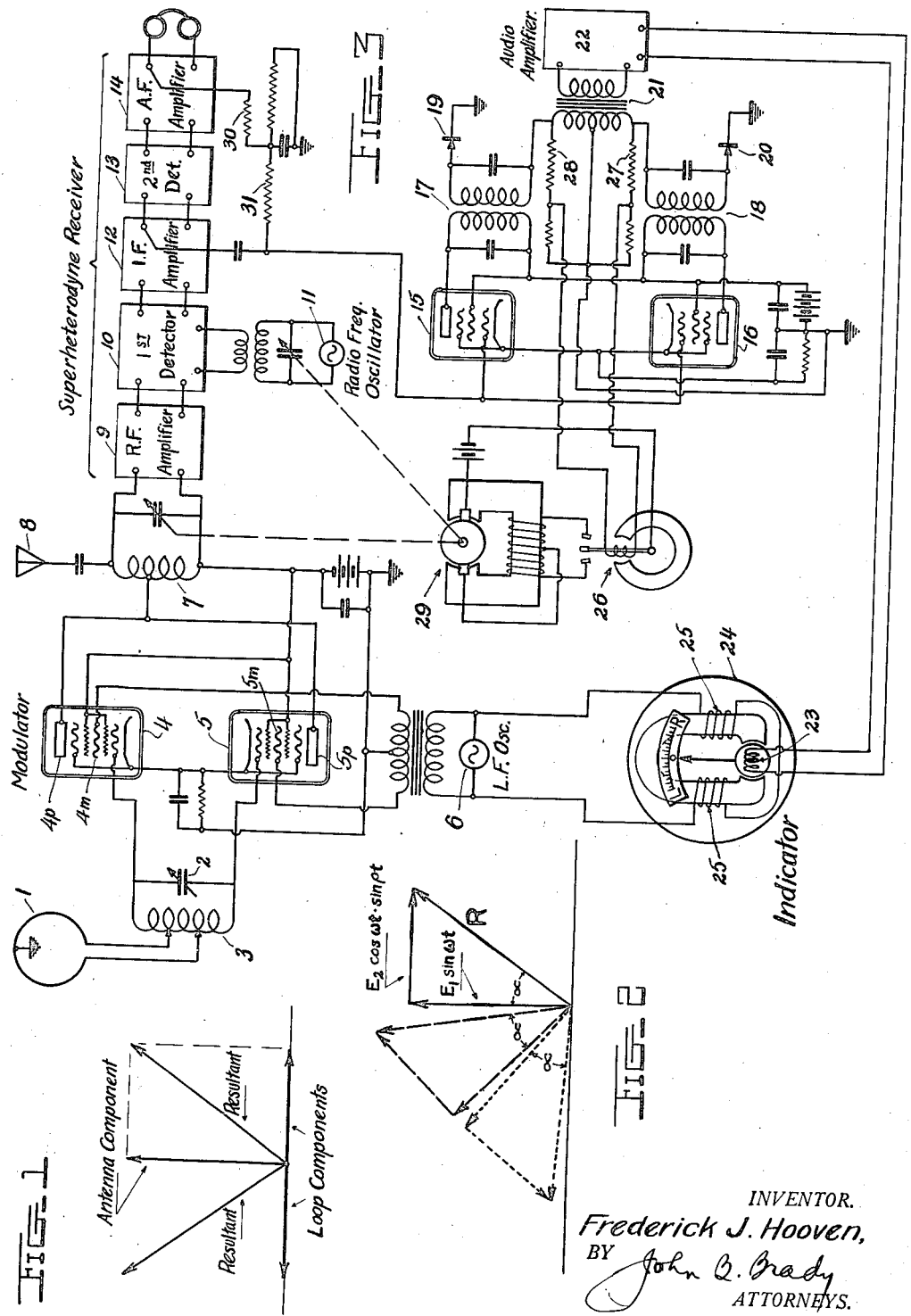

2,190,787

UNITED STATES PATENT OFFICE 2,190,787

RADIO COMPASS

Frederick J. Hooven, Dayton, Ohio

Application February 12, 1936, Serial No. 63,664
Renewed June 30, 1939

14 Claims. (Cl. 250—11)

My invention relates to a system for radio direction finding, such as is used on aircraft, ships and land stations for navigation purposes. More particularly, my invention relates to an improved means whereby radio signals, radiated by a transmitting station, may be caused to provide a visible indication at a receiving station showing the direction from which said signals are arriving at the receiving station.

One of the objects of my invention is to provide a direction finding system that will be little affected by modulation of the received wave or by noises which may be impressed simultaneously on the receiving antennae.

Still another object of my invention is to provide a more efficient means of combining the signals received by a directional antenna with the signals received from the same source of radiation by a non-directional antenna in order to furnish the operator of the receiving station with a visible indication showing the relative direction of the source of the radiated signal with respect to the receiving station.

A still further object of my invention is to provide a system of direction finding in which a modulated signal may be received and understood through the normal receiving circuit with the minimum of interference from the direction finding circuit.

A further object of my invention is to provide means whereby the receiving circuit may be tuned automatically to the exact frequency of the transmitting station using circuits which are an integral part of any direction finding system.

Other and further objects of my invention will be apparent from the specification hereinafter following, by reference to the accompanying drawing; in which:

Figures 1 and 2 are vector diagrams explaining my invention; and Fig. 3 is a diagrammatic view of the radio compass of my invention.

My radio direction finder employs a circuit in which the signals from a directional antenna are impressed on a balanced modulator, modulated from a low frequency oscillator, the output of which consists entirely of sidebands, with no original carrier frequency. The output of this balanced modulator is combined with the signal from a non-directional antenna so that a modulated wave, consisting of both carrier and sidebands, is impressed on a radio receiving system. The phase of the modulation of this modulated wave depends on the phase of the signal picked up by the directional antenna. Means are provided whereby the signal is demodulated after suitable amplification, and the phase of the modulation is compared with that of the modulating oscillator by means of a dynamometer, or bridge circuit with galvanometer so as to indicate the phase of the radio signal received by the loop, and thus the sense of arrival of the received signal.

In all direction finders heretofore known it has been necessary to correct for the fact that the signal voltage induced in a directional antenna is 90° out of phase with the voltage produced in a non-directional antenna by the same signal. Various means have been described whereby the loop or antenna is detuned from resonance, or resistance is inserted in the antenna, or phase changing impedances are inserted in the circuit of one or the other component before they are mixed.

This is necessary, for as can be seen in Fig. 1 of the accompanying drawing, if the two components are 90° out of phase with one another, there will be no amplitude modulation at the modulating frequency of the balanced modulator, but only modulation containing even harmonics of the modulating frequency, which do not operate the indicator.

In my invention I carefully avoid shifting the phase of either loop or antenna component before combining, and purposely strive to attain the condition which other direction finder circuits show means to avoid, namely, the combining of the loop and antenna signals at 90° out of phase. If a carrier wave is combined with a pair of sidebands, or modulating vector, which is 90° out of phase with the carrier, the result is frequency or phase modulation. Since the only difference between frequency and phase modulation concerns the relation between frequency shift of carrier with relation to the modulating frequency, and I use but one modulating frequency, it follows that there is substantially no distinction between the two in my invention, and I will henceforth refer to this modulation as frequency modulation. Reference to the vector diagram, Fig. 2 shows this effect without undue mathematical formulae. I represent the unmodulated carrier present in the non-directional antenna by the vector $E_1 \sin \omega t$, where $\omega/2\pi$ is the carrier or high frequency. The signal output of the balanced modulator may be properly represented by the vector $E_2 \cos \omega t \sin pt$ where $p/2\pi$ is the modulator or low frequency, in cycles per second, and $E_2 = K\phi \sin \theta$ where $\phi$ is the field strength of the signal, and $\theta$ is the angle of the loop axis to the direction of the incident wave.

The vectors shown by the dashed line represent the state of affairs after a small fraction of the $\omega$ cycle has elapsed, while the dotted vectors show the state of affairs after a relatively longer interval, a part of a $\rho$ cycle has elapsed, when $\sin \rho t$ has become negative. The resultant vector R is alternately lagging behind the carrier vector, then leading it by the angle $$\alpha = \tan^{-1}\left(\frac{E_2 \cos \omega t \sin \rho t}{E_1 \sin \omega t}\right)$$

The resultant then is constantly changing its angular velocity between the extreme values of $$\omega + \frac{E_2}{E_1}\rho \text{ and } \omega - \frac{E_2}{E_1}\rho, \quad \omega + \frac{E_2}{E_1}\rho \cos \rho t$$

being the frequency of the resultant vector.

My invention provides for the operation of my direction indicator, a receiving circuit which is responsive to frequency modulation and not responsive to amplitude modulation. Since ordinarily the modulation of a radio telephone or telegraph transmitter is amplitude and not frequency modulation, and since undesired noise results in mostly amplitude modulation, it follows that my invention provides a direction finder whose indicator is practically unaffected by station modulation or noise. Furthermore, since all phase changing arrangements involve a loss, it follows that by eliminating these I have eliminated a source of inefficiency present in all direction finders of the general type known prior to my invention. This is important in the reception of weak signals, because it is desirable to combine the loop and antenna signals before either has been amplified appreciably, due to the possibility of variable phase shifts in the amplifiers and associated circuits, and it is well known that, because of noises inherent in vacuum tubes and associated circuits, it is not possible by any degree of amplification to compensate for a loss introduced in a circuit of extremely low power level.

Referring to Fig. 3 which shows a schematic diagram of my direction finder, a loop antenna 1 is tuned by condenser 2 and coil 3 to the frequency of the received wave, and the received voltage is impressed on the control grids of vacuum tubes 4 and 5. Impressed on the modulating grids 4m and 5m of these tubes is the output of the low-frequency oscillator 6, in opposite phase, while the plates 4p and 5p of these tubes are connected in parallel through a portion of the coil 7 to which is also connected the non-directional antenna 8. The resultant frequency modulated wave in coil 7 is impressed on a radio receiver of the superheterodyne type, consisting of a radio frequency amplifier 9, a detector 10, a radio frequency oscillator 11, an intermediate frequency amplifier 12, a second detector 13, connected to an audio frequency responsive circuit 14. The output of the intermediate frequency amplifier 12 is also impressed on the grids of the two vacuum tubes 15 and 16 which are connected to the coils 17 and 18. The coils 17 and 18 are not tuned to the frequency of the amplifier 12, but instead are tuned to some frequency higher and another frequency the same amount lower, respectively, than the frequency of amplifier 12. The currents in coils 17 and 18 are impressed on rectifiers 19 and 20 and the rectified resultants are impressed on the low-frequency coil 21 in push-pull fashion, so that only the difference in the two currents will produce a voltage in the audio amplifier 22. When a frequency modulated wave is impressed on the circuits 17 and 18, the currents in one coil will be greater as the instantaneous value of the carrier frequency approaches the frequency to which that coil is tuned, while the other will be less, while an instant later the opposite state of affairs will obtain. Thus, these periodic differences in the currents in the two coils will result in differences between the two currents flowing in opposition through the coil 21, and will impress a voltage on the input of the audio amplifier 22, which will in turn cause a current of frequency $\rho/2\pi$ to flow in the moving coil 23 of the meter 24, which will cause the meter to deflect.

I have shown that the frequency modulation of the received carrier will be expressed by $$\omega + \frac{E_2}{E_1}\rho \cos \rho t$$

whence it will be observed that the current flowing in coil 23 may be expressed by $$I = K\frac{E_2}{E_1} \cos \rho t$$

Since $E_2$ is a function of $\sin \theta$ the angle of the loop axis to the incident wave, it follows that the phase of I is dependent on the phase of $E_2$ and consequently on the angle of the loop. Since the voltage impressed on the field coil 25 of the meter 24 is that of the oscillator 6, $E = K \sin \rho t$ the current in the field coil, assuming it to be a pure inductance, will be $I_f = K \cos \rho t$. The deflection of the needle being a function of the product of these two currents, it follows that the direction of the meter deflection will be a function of the angle of the loop to the incident wave. On the other hand, any amplitude modulation present in the amplifier 12 will cause simultaneous variations in the currents in coils 17 and 18, which will cause equal and opposite currents to flow in the two halves of coil 21, which will neutralize one another and cause no voltage to be impressed on the amplifier 22. However, any unbalance present in the rectifiers 19 and 20 will cause these currents to be unequal and, therefore, will cause some response of the circuit to amplitude modulation. I have, therefore, shown means whereby a portion of the amplitude modulation in the circuit of the detector and amplifier 14 is impressed on the grids of tubes 15 and 16 through resistances 30 and 31 in such a manner as to cause the mutual conductance of these tubes to vary inversely with the carrier strength in the receiving circuit, thus substantially removing amplitude modulation from the coils 17 and 18. I have also shown a galvanometer relay 26 so connected as to be actuated by the difference in the currents in the resistances 27 and 28 in circuit with the rectifiers 19 and 20, so that if the operator of the receiver fails to tune in the received wave exactly, there will be more current flowing in that coil (17 or 18) which happens to be tuned nearest the incoming signal, which will cause an unbalance to exist between the currents in resistors 27 and 28, thus throwing the relay and causing motor 29 to rotate the tuning control of the receiver until the currents in coils 17 and 18 are equal.

I have here, for the sake of clearness, neglected the effects of phase shifts in the modulation frequency which might result from the characteristics of the radio receiver or audio amplifier, but I wish it to be understood that means for correcting for such effects by causing a shift in the phase of the current in coil 25 shall not be outside the scope of my invention.

I also wish it to be understood that while I have shown a certain means of accomplishing the results which I seek, I do not wish to be limited to those combinations of means which I have shown. It may be possible, for instance, to substitute for the dynamometer type of meter, which I have shown, a direct current galvanometer and bridge circuit rectifier. While I have shown and referred to a loop and non-directional antenna, it would be possible, without exceeding the scope of my invention, to substitute any other of a number of well known types of directional antenna for the loop. While I have shown a single coil as the impedance in which modulator and antenna components are combined, it is possible to use a vacuum tube with a multiplicity of grids, a resistor, or a condenser or almost any type of impedance.

What I claim as new and desire to secure by Letters Patent of the United States is as follows:

1. A radio direction finder comprising a directional receiving means, a non-directional receiving means, a generator of low frequency oscillations, means for modulating the amplitude of current flowing in one of said receiving means by said low frequency oscillations, impedance means for combining said modulated current with the current in the other of said receiving means resulting in a frequency modulated wave, a demodulating circuit responsive only to frequency modulation and coupled with said impedance means, and an indicator responsive to the combined outputs of said demodulating circuit and said low frequency generator 2. A radio direction finder comprising a directional receiving means, a non-directional receiving means, a generator of low frequency oscillations, means for modulating the amplitude of current flowing in one of said receiving means by said low frequency oscillations, impedance means for combining said modulated current with the current in the other of said receiving means resulting in a frequency modulated wave, a demodulating circuit responsive only to frequency modulation and coupled with said impedance means, an indicator responsive to the combined outputs of said demodulating circuit and said low frequency generator, and means controlled by the incoming signal energy through said demodulating circuit for adjusting said non-directional receiving means precisely to the frequency of the received energy.

3. A radio direction finder comprising a directional receiving means, a non-directional receiving means, a generator of low frequency oscillations, means for modulating the amplitude of current flowing in one of said receiving means by said low frequency oscillations, producing currents of frequencies within side-bands adjacent the carrier frequency of said current, impedance means for combining said modulated current with the current in the other of said receiving means, separate branch circuits coupled with said impedance means and tuned to side-band frequencies on opposite sides of the carrier frequency received, and means controlled by the difference in the currents in said branch circuits for controlling the adjustment of said non-directional receiving means precisely to the frequency of the received energy.

4. A radio direction finder comprising a directional receiving means, a non-directional receiving means, a generator of low frequency oscillations, means for modulating the amplitude of current flowing in one of said receiving means by said low frequency oscillations, impedance means for combining said modulated current with the current in the other of said receiving means resulting in a frequency modulated wave, a demodulating circuit responsive only to frequency modulation and coupled with said impedance means, an indicator responsive to the combined outputs of said demodulating circuit and said low frequency generator, means for precisely controlling the frequency adjustment of said non-directional receiving means according to the frequency of the received signal energy, and means for compensating in said demodulating circuit for amplitude modulation in said non-directional receiving means.

5. In a navigation apparatus, separate means for receiving amplitude modulated radio frequency signaling energy directionally and non-directionally, a circuit responsive to amplitude modulation and controlled by one of said means, means for effecting frequency modulation of the signaling energy in accordance with the phase difference of said energy in said directional and said non-directional receiving means, and a circuit responsive to frequency modulation, and controlled by the last said means.

6. In a radio navigation apparatus, a directional receiving means, a non-directional receiving means, a radio receiving system coupled with both said means and including means for delivering a frequency modulated wave therefrom, a circuit responsive only to frequency modulation and controlled conjointly by both said receiving means, another circuit responsive only to amplitude modulation and controlled only by said non-directional receiving means, a visual indicator connected with one of said circuits, and an aural indicator connected with the other of said circuits.

7. In a radio navigation apparatus, a directional receiving means, a non-directional receiving means, a local oscillator coupled with said directional receiving means, a combining circuit for mixing the outputs of said means and producing a frequency modulated wave, a circuit responsive only to frequency modulation, another circuit responsive only to amplitude modulation, both said circuits being coupled with both said means, a visual indicator in circuit with and responsive to the combined outputs of said frequency modulation responsive circuit and said local oscillator, and an aural indicator in circuit with and responsive to the other of said circuits, whereby aural indication of position may be had by means of the circuits responsive to amplitude modulation and visual indication of position by means of the circuits responsive to frequency modulation.

8. A radio direction finder comprising a directional receiving means, a non-directional receiving means, a generator of low frequency oscillations, means for modulating the amplitude of current flowing in one of said receiving means by said low frequency oscillations, impedance means for combining said modulated current with the signal current in the other of said receiving means to produce frequency modulation of the signal current, a demodulating circuit responsive only to frequency modulation and including a pair of branch circuits, an indicating meter having a field winding and an armature winding, a circuit common to each of said branch circuits, and means interconnecting said last mentioned circuit and the armature winding of said meter, and means controlled by the differential output of said branch circuits for controlling the tuning adjustment of said non-directional receiving means.

9. In a navigation apparatus, separate means for receiving radio frequency energy directionally and non-directionally, means for effecting frequency modulation of received energy in accordance with the phase difference of said energy in said directional and said non-directional receiving means, a circuit responsive to frequency modulated energy and controlled by the last said means, and an indicator connected to said circuit and responsive to the frequency modulation of the energy in said circuit.

10. In a navigation apparatus, a non-directional receiving means, a directional receiving means, a radio receiving system coupled with both said means and including means for delivering a frequency modulated wave therefrom, a circuit responsive to frequency modulation and controlled conjointly by both said receiving means, and an indicator connected to said circuit and responsive to the frequency modulation of the energy in said circuit.

11. In a navigation apparatus, a non-directional receiving means, a directional receiving means, a radio receiving system coupled with both said means and including means for delivering a frequency modulated wave therefrom, a circuit responsive to frequency modulation connected to said receiving system, and an indicator connected to said frequency modulation responsive circuit.

12. In a radio navigation device, a directional receiving means, a local oscillator, a modulator constituting means for combining the outputs of said directional receiving means and said local oscillator to produce currents of frequencies within side-bands adjacent the carrier frequency of the current in said directional receiving means, a non-directional receiving means, an impedance constituting means for combining the outputs of said modulator and said non-directional receiving means in phase quadrature whereby frequency modulation of signal energy in said non-directional receiving means is effected, an amplifying system coupled with said impedance, two tuned circuits connected to the output of said system, one of said circuits being tuned to sideband frequencies above the carrier frequency of the signal energy, the other circuit being tuned to side-band frequencies below the carrier frequency of the signal energy, a rectifier connected to each of said circuits, and an indicator connected in circuit to the output of said rectifiers and responsive to the differential output of the two said rectifiers combined with the output of said local oscillator.

13. In a radio navigation device, a directional receiving means, a local oscillator, a modulator constituting means for combining the outputs of said directional receiving means and said local oscillator to produce currents of frequencies within side-bands adjacent the carrier frequency of the current in said directional receiving means, a non-directional receiving means, an impedance constituting means for combining the outputs of said modulator and said non-directional receiving means in phase quadrature whereby frequency modulation of signal energy in said non-directional receiving means is effected, an amplifying system coupled with said impedance, two tuned circuits connected to the output of said system, one of said circuits being tuned to sideband frequencies above the carrier frequency of the signal energy, the other circuit being tuned to side-band frequencies below the carrier frequency of the signal energy, a rectifier connected to each of said circuits, a visual indicator in circuit with said rectifiers and responsive to the differential output of the two said rectifiers combined with the output of said local oscillator, a detector circuit connected to the output of said amplifying system, and an aural indicator connected to the output of said detector circuit.

14. In a radio navigation device, a directional receiving means, a local oscillator, a modulator constituting means for combining the outputs of said directional receiving means and said local oscillator to produce currents of frequencies within side bands adjacent the carrier frequency of the current in said directional receiving means, a non-directional receiving means, an impedance constituting means for combining the outputs of said modulator and said non-directional receiving means in phase quadrature whereby frequency modulation of signal energy in said non-directional receiving means is effected, an amplifying system coupled with said impedance, two tuned circuits connected to the output of said system, one of said circuits being tuned to sideband frequencies above the carrier frequency of the signal energy, the other circuit being tuned to side-band frequencies below the carrier frequency of the signal energy, a rectifier connected to each of said circuits, an indicator in circuit with and responsive to the varying differential output of the two said rectifiers combined with the output of said local oscillator, a relay connected to the output of said rectifiers and responsive to the instantaneous differential outputs of the two said rectifiers, and means for controlling the frequency adjustment of said amplifying system in accordance with the movement of said relay.

FREDERICK J. HOOVEN.